3,291,799
ISOQUINOLINE CARBOXAMIDINE
Wilhelm Wenner, Upper Montclair, N.J., assignor to Hoffmann-La Roche Inc., Nutley, N.J., a corporation of New Jersey
No Drawing. Filed Sept. 21, 1964, Ser. No. 398,040
9 Claims. (Cl. 260—286)

This application is a continuation-in-part of applications Serial No. 177,719, filed March 6, 1962, now abandoned, and Serial No. 245,426, filed December 18, 1962, now U.S. Patent No. 3,157,573.

This invention relates to novel heterocyclic compounds, methods for preparing them and pharmaceutical compositions which have for their essential active ingredients, at least one of the herein described compounds. The compounds to which this invention pertains are 1,2,3,4-tetrahydro-isoquinoline compounds, bearing a guanyl substituent on the hetero nitrogen atom. More specifically, the compounds to which this invention pertains can be denoted as 3,4-dihydro-2(1H)-isoquinoline carboxamidines or, in the alternative, 1,2,3,4-tetrahydro-isoquinoline-2-carboxamidines. The compounds of this invention are selected from the group consisting of compounds of the formula

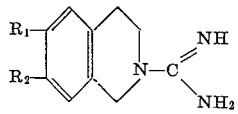

and acid addition salts thereof;
wherein $R_1$ and $R_2$ are, individually, selected from the group consisting of lower alkoxy, hydroxy, hydrogen, and taken together, lower alkylenedioxy.

The expression "lower alkyloxy" as used herein comprehends both straight and branched chain hydrocarbon groups such as methoxy and the like. The expression "lower alkylenedioxy" as used herein is exemplified by groups such as methylenedioxy and the like.

In the above Formula I, either one or both of the symbols $R_1$ and $R_2$ can represent hydrogen or one of the enumerated substituent groups so that either an unsubstituted fused phenyl ring or a fused phenyl ring bearing one or two substituent groups can be present. However, it is preferred that the fused phenyl ring be unsubstituted, i.e., a compound of Formula I above wherein $R_1$ and $R_2$ are both hydrogen, or be di-substituted with two substituent groups which may be the same or different, of the type enumerated above in connection with the definition of $R_1$ and $R_2$. Preferred compounds of Formula I above are those wherein $R_1$ and $R_2$ are hydrogen; those wherein $R_1$ and $R_2$ are lower alkoxy, advantageously, methoxy and those wherein one of $R_1$ and $R_2$ is hydroxy and the other of $R_1$ and $R_2$ is lower alkoxy, preferably, methoxy.

As is evident from the above, the broad genus illustrated in Formula I above embraces various subgenuses which are particularly advantageous for the purposes of the present invention.

One of the said particularly advantageous subgenuses encompasses compounds selected from the group consisting of a compound of the formula 3,4-dihydro-2(1H)-isoquinolinecarboxamidine     II and acid addition salts thereof with pharmaceutically acceptable acids.

Another of the said particularly advantageous subgenuses includes compounds selected from the group consisting of compounds of the formula

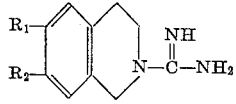

wherein $R_1$ and $R_2$ are individually selected from the group consisting of lower alkoxy, preferably methoxy, and taken together, lower alkylenedioxy and acid addition salts thereof with pharmaceutically acceptable acids. In this advantageous aspect of the present invention, $R_1$ and $R_2$ are preferably both lower alkoxy.

Still another of the said particularly advantageous subgenuses included within the purview of the present invention embraces compounds selected from the group consisting of compounds of the formula

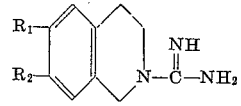

wherein $R_1$ and $R_2$ are individually selected from the group consisting of hydroxy and lower alkoxy, preferably, methoxy, one of $R_1$ and $R_2$ being hydroxy and the other of $R_1$ and $R_2$ being lower alkoxy and acid addition salts thereof with pharmaceutically acceptable acids.

The compounds of Formulae I, II, III and IV above are basic compounds which form acid addition salts with inorganic or organic acids. Thus, they form pharmaceutically acceptable acid addition salts with both pharmaceutically acceptable organic and inorganic acids such as the hydrohalides, e.g., hydrochloride, hydrobromide, hydroiodide, other mineral acid salts such as sulfate, nitrate, phosphate and the like, alkyl- and mono-aryl sulfonates such as ethanesulfonate, toluenesulfonate, benzenesulfonate, or the like, other organic acids such as acetate, tartrate, maleate, citrate, benzoate, salicylate, ascorbate, and the like. Non-pharmaceutically acceptable acid addition salts of compounds of Formulae I, II, III and IV above can be converted into pharmaceutically acceptable acid addition salts via conventional metathetic reactions whereby the non-pharmaceutically acceptable anion is replaced by a pharmaceutically acceptable anion; or alternatively by neutralizing the non-pharmaceutically acceptable acid addition salt and then reacting the so-obtained free base with a reagent yielding a pharmaceutically acceptable anion.

The compounds of Formulae I, II, III and IV above can be prepared by reacting a 1,2,3,4-tetrahydro-isoquinoline of the formula

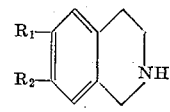

wherein $R_1$ and $R_2$ have the same meaning as above, with an acid addition salt of 2-lower alkyl-2-isothiourea. By utilizing an acid addition salt of the 2-lower alkyl-2-isothiourea the product obtained is the corresponding acid addition salt of a compound of Formulae I, II, III and IV above. There is no particular temperature critical to the success of this reaction and it can be conducted at room temperature or below or above room temperature. Similarly it can be conducted at atmospheric pressure or at reduced or elevated pressure. The reaction should be carried out in a medium which serves as a solvent for the reactants and any suitable conventional solvent medium can be used for this purpose, for example, the reaction can be conducted in an aqueous system, an aqueous alcoholic system, or the like aqueous system containing a water miscible solvent.

In an alternate method of preparing compounds of Formulae I, II, III and IV above, a 1,2,3,4-tetrahydroisoquinoline of Formula V is reacted with an acid addition salt of 2-lower alkyl-2-pseudourea. By utilizing an acid addition salt of 2-lower alkyl-2-pseudourea, the product obtained is the corresponding acid addition salt of the compound of Formulae I, II, III and IV above. There is no particular temperature critical to the success of this reaction. It can be conducted at room temperature or below or above room temperature. It can be conducted at atmospheric pressure or at reduced or elevated pressure. Suitably, it is conducted at atmospheric pressure and between about room temperature and about 100° C., preferably between about 50° C. and about 80° C. The reaction should be carried out in a medium which serves as a solvent for the reactants, and any suitable conventional solvent medium can be used for this purpose, for example, said reaction can be conducted in an aqueous system, an aqueous alcoholic system, or the like aqueous system containing a water miscible solvent.

In yet another embodiment of this invention, compounds of Formula I wherein $R_3$ and $R_4$ are both hydrogen can be prepared by reacting a 1,2,3,4-tetrahydroisoquinoline of Formula V with a pyrazole-1-carboxamidine. Suitably, the process comprises reacting a compound of Formula V with an acid addition salt of 3,5-di-lower alkyl)-pyrazole-1-carboxamidine. By utilizing an acid addition salt of pyrazole-1-carboxamidine, the product obtained is the corresponding acid addition salt of the compound of Formula I. There is no particular temperature critical to the success of this reaction. It can be conducted at room temperature or below or above room temperature. It can be conducted at atmospheric pressure or at reduced or elevated pressure. Suitably, it is conducted at atmospheric pressure and between about room temperature and about 100° C., preferably between about 70° C. and about 100° C. The reaction should be carried out in a medium which serves as a solvent for the reactants and any suitable conventional solvent medium can be used for this purpose, for example, said reaction can be conducted in an aqueous system, an aqueous alcoholic system, or the like aqueous system containing a water miscible solvent.

Compounds of Formula I can also be prepared by reacting the corresponding compound of the Formula V above or acid addition salts thereof with cyanamide. This reaction can be conducted with or without a solvent, for example, a salt of a compound of Formula V above can be fused with cyanamide. It is, however, advantageous to conduct the reaction in an inert solvent, for example, an aromatic hydrocarbon such as toluene, xylene or the like. When such a solvent is used and the compound of Formula V is reacted in the form of its salt, the salt does not go into solution in the reaction mixture, but the reaction proceeds in a heterogeneous manner and yields a compound of Formulae I, II, III and IV above. The reaction with cyanamide can also be carried out in other solvents, for example, it is suitable to carry out the condensation with cyanamide in water, in a lower alkanol or in an aqueous lower alkanolic solution. When conducting the reaction in an aromatic hydrocarbon, it is suitable to effect the reaction at reflux. However, the reaction can be conducted at lower temperature, for example, at about 100° C. or over.

The compounds of Formulae I, II, III and IV above and pharmaceutically acceptable acid addition salts thereof are useful as hypotensives. For example, they lower blood pressure in animals, such as rats, mice, cats and dogs.

The compounds of Formulae I, II, III and IV and their pharmaceutically acceptable acid addition salts can be administered orally or parenterally with dosage adjusted to individual requirements. They can be administered therapeutically, for example, orally or parenterally, by incorporating a therapeutic dosage in a conventional dosage form, such as tablets, capsules, elixers, suspensions, solutions or the like. They can be administered in mixture with conventional pharmaceutical carriers or excipients, such as, for example, corn starch, calcium stearate, magnesium carbonate, calcium silicate, dicalcium phosphate, talc, lactose, and the like. Moreover, they can be administered in the presence of buffers, or agents used to adjust to isotonicity, and the pharmaceutical dosage forms can, if desired, be subjected to conventional pharmaceutical expedients such as, for example, sterilization. As stated above, the dosage can be adjusted to individual requirements.

The following examples are illustrative but not limitative of the invention. Temperatures, unless otherwise stated, are expressed in degrees centigrade.

*Example 1*

13 g. of 1,2,3,4-tetrahydroisoquinoline and 17 g. of 2-ethyl-2-isothiourea hydrobromide were dissolved in ca. 50 ml. of water. A clear solution formed on shaking, and was heated to 80° for 3 hours. The resulting mixture was distilled to dryness in vacuo at 50–60°, leaving a crystallized residue which was triturated with acetone and filtered, yielding crystals which upon recrystallization from ca. 100 ml. water gave 1,2,3,4-tetrahydroisoquinoline-2-carboxamidine hydrobromide melting at 170–171° (uncorr.).

*Example 2*

27 g. of 1,2,3,4-tetrahydroisoquinoline was added at room temperature to a solution of 28 g. of 2-methyl-2-isothiourea sulfate in 80 ml. of water. The resulting mixture was kept at room temperature with occasional shaking. After a short period of time, methylmercaptan began to escape, and the mixture warmed up slightly. After then standing for 24 hours, crystals formed. They were filtered off and rinsed with ice cold water. Recrystallization fro approximately 100 ml. of water yielded 1,2,3,4 - tetrahydroisoquinoline - 2-carboxamidine sulfate melting at 278–280° (uncorr.).

Another batch prepared in the same manner melted at 284–285° due to a minute difference in moisture content.

Both batches prepared above analyzed correctly for $(C_{10}H_{13}N_3)_2 \cdot H_2SO_4$.

*Example 3*

44.85 g. of 1,2,3,4 - tetrahydroisoquinoline - 2 - carboxamidine sulfate was dissolved at room temperature in 1000 ml. water and 18.94 g. of finely ground barium hydroxide monohydrate added thereto. The resulting mixture was shaken on a shaking machine for 24 hours. The precipitated barium sulfate was filtered off, and the clear filtrate distilled to dryness in vacuo. A colorless viscous oil remained, which slowly solidified to a soft crystalline mass of the free base, 1,2,3,4-tetrahydroisoquinoline-2-carboxamidine. It was very soluble in water and in alcohols. In ether it dissolved sparingly, and in ligroin it was insoluble. When left standing exposed to the air, it took up carbon dioxide and formed the carbonate.

*Example 4*

10 g. of 1,2,3,4-tetrahydroisoquinoline-2-carboxamidine sulfate was dissolved in 200 ml. water on a steambath and a solution of 5.45 g. of barium chloride dihydrate in 30 ml. of water added thereto. The mixture was warmed for ½ hour, the precipitated barium sulfate filtered off and the clear filtrate distilled to dryness, leaving a practically colorless viscous residue which was dissolved in a small amount of absolute alcohol, and the resulting solution then cautiously diluted with anhydrous ether, until a slight turbidity remained. On standing for several hours, crystals formed. They were filtered off, washed with ether and dried, yeilding 1,2,3,4-tetrahydroisoquinoline-2-carboxamidine hydrochloride melting at 179° (uncorr.).

*Example 5*

2 g. of 1,2,3,4-tetrahydroisoquinoline-2-carboxamidine sulfate was dissolved in a small amount of water. The resulting solution was cooled with ice water and an excess of sodium hydroxide added thereto. The resulting alkaline mixture was repeatedly extracted with ether and the combined ether extracts dried over potassium carbonate and filtered. Into the filtered clear solution carbon dioxide gas was introduced, causing 1,2,3,4-tetrahydroisoquinoline-2-carboxamidine carbonate to crystallize. The carbonate melted at 136–138° (uncorr.).

*Example 6*

10 g. of 1,2,3,4-tetrahydroisoquinoline-2-carboxamidine sulfate was slowly added to an ice cold solution of 10 g. of potassium hydroxide in 10 ml. of water. The mixture was then extracted repeatedly with ether and the resulting ether solution cautiously neutralized with nitric acid whereupon 1,2,3,4 - tetrahydroisoquinoline - 2 - carboxamidine nitrate precipitated. It melted at 146–148° (uncorr.).

*Example 7*

3 g. of 6,7-dimethoxy-1,2,3,4-tetrahydroisoquinoline was dissolved in 25 ml. of methanol and a solution of 2.2 g. of 2-methyl-2-isothiourea sulfate in 15 ml. of water added thereto. The mixture was allowed to stand at room temperature for 1 day and was then warmed to 60–70° for 5 hours. The solution was then evaporated in vacuo and the solid residue triturated with absolute alcohol and filtered. The so-obtained crystals were recrystallized from 90% alcohol, yielding 6,7-dimethoxy-3,4-dihydro - 2(1H) - isoquinolinecarboxamidine sulfate melting at 259–261° (uncorr.). The end product thus obtained is useful as a hypotensive and vasodilator.

More particularly, 6,7-dimethoxy-3,4-dihydro-2(1H)-isoquinolinecarboxamidine (and its salts), which act at vascular levels, effects an increase in peripheral vascular blood flow with a decrease in peripheral vascular resistance and without any substantial inhibition of the peripheral autonomic system. Though this compound interferes with the adrenergic system, no significant blocking effect upon adrenergic effector sites occurs. It is preferably administered parenterally, but can also be administered orally.

On the other hand, 1,2,3,4-tetrahydroisoquinoline-2-carboxamidine (and its salts) while being useful as a hypotensive which interferes with the adrenergic system without significantly blocking adrenergic effector sites, does not evidence any substantial vasodilating effect. Furthermore, this compound which acts on the postganglionic segments of the sympathetic autonomic nerves has not been observed to produce an increase in peripheral vascular blood flow. It is preferably administered orally.

*Example 8*

13.5 g. of 1,2,3,4-tetrahydroisoquinoline and 12 g. of O-methyl-pseudourea sulfate were dissolved in 100 ml. of water. After standing at room temperature for 24 hours, the solution was refluxed for 20 hours, and then cooled in ice for several hours. Crystals separated and were filtered off. The filtrate was distilled to dryness and the mixture stirred with alcohol and filtered. The crystals were recrystallized from water, yielding 3,4-dihydro-2(1H)-isoquinoline carboxamidine sulfate melting at 266–268°.

*Example 9*

13.3 g. of 1,2,3,4-tetrahydroisoquinoline and 20 g. of 3,5-dimethyl-pyrazole-1-carboxamidine nitrate were refluxed overnight in 200 ml. of absolute alcohol. The solvent was removed by distillation in vacuo, leaving a crystalline mass. On triturating with 60 ml. of alcohol at room temperature, part of the material dissolved. The mixture was filtered and the crystals were washed with ice cold alcohol, yielding 3,4-dihydro-2(1H)-isoquinoline carboxamidine nitrate melting at 144–146°. A mixed melting point with a sample of the nitrate prepared from the sulfate made by the synthesis of Example 2 showed no depression.

*Example 10*

A solid pharmaceutical composition was prepared by blending the following material in the proportions by weight specified:

3,4-dihydro-2(1H)-isoquinoline carboxamidine
  sulfate _____ 26.110
Pregelatinized corn starch _____ 7.000
Corn starch _____ 32.000
Dicalcium phosphate _____ 32.875

The above ingredients were thoroughly blended and passed through a suitable size screen. F.D. and C. Blue dye No. 1 (.015 part) dissolved in water was used to granulate the above screened composition containing the active ingredient. The wet granulated composition was then passed through a suitable size screen, dried at 110° F., and again passed through a suitable size screen. Calcium stearate (2 parts) was then added to the mixture, the resulting composition blended well and compressed on a ⁵⁄₁₆″ flat, beveled punch, each tablet being of such size that it contained 40.000 mg. (base equivalent) of the active ingredient.

*Example 11*

A solid pharmaceutical composition was prepared by blending the following material in the proportions by weight specified:

3,4-dihydro-2(1H)-isoquinoline carboxamidine
  sulfate _____ 17.406
Pregelatinized corn starch _____ 6.667
Corn starch _____ 36.667
Dicalcium phosphate _____ 37.2597

The above ingredients were thoroughly blended and passed through a suitable size screen. F.D. and C. Blue No. 1 (0.0003 part) dissolved in water was used to granulate the screened composition containing the active ingredient. The wet granulated composition was then passed through a suitable size screen, dried at 110° F., and again passed through a suitable size screen. Calcium stearate (2 parts) was then added to the mixture, the resulting composition blended well and compressed on a ⁹⁄₃₂″ flat, beveled punch, each tablet being of such size that it contained 20.000 mg. (base equivalent) of the active ingredient.

*Example 12*

The following injectable formulations were prepared containing the following ingredients:

| Chemical Name | Ampul Size | |
|---|---|---|
| | 1 cc. | 2 cc. |
| 3,4-dihydro-2(1H)-isoquinoline-carboxamidine sulfate, mg. | 25.0 | 50.0 |
| Disodium hydrogen citrate, percent | 0.1 | 0.1 |
| Phenol anhydrous U.S.P., percent | 0.45 | 0.45 |
| Sodium chloride U.S.P., percent | 0.4 | 0.4 |
| Disodium dihydrogen ethylene diamine tetraacetate, percent | 0.01 | 0.01 |
| Injection water | q.s. | q.s. |

Exemplary of the preparation of the above injectable solution is the following description of the preparation of 1 liter of solution used to fill into ampuls. The following ingredients were used:

3,4-dihydro-2(1H)-isoquinoline carboxamidine sulfate (with 2% excess) _____g.___ 25.5
Disodium hydrogen citrate _____g.___ 1.0
Phenol anhydrous, U.S.P. _____g.___ 4.5
Sodium chloride, U.S.P. _____g.___ 4.0
Disodium dihydrogen ethylene diamine tetraacetate _____mg.___ 100.0
Injection water, q.s. to 1000.0 ml.

A similar injectable solution was prepared using in place of the disodium hydrogen citrate a mixture of 0.3 g. of citric acid U.S.P. and 0.7 g. of trisodium citrate.)

The ingredients were dissolved in about 700 cc. of injection water and the pH of the solution adjusted to 5.0±0.2 using dilute sodium hydroxide or dilute sulfuric acid as needed. The solution was then adjusted to volume and filtered through a 02 Selas candle and filled into amber ampuls under nitrogen gas.

*Example 13*

A dry solid pharmaceutical composition was prepared by blending the following materials in the proportions by weight specified:

| | |
|---|---|
| 3,4-dihydro-2(1H)-isoquinoline carboxamidine hydrobromide | 16.4 |
| Corn starch | 43.3 |
| Dicalcium phosphate | 36.5 |
| Calcium stearate | 2.0 |

The active ingredient was blended with part of the corn starch and all the dicalcium phosphate. A corn starch paste was then made by mixing in the balance of the starch and, as in Examples 10 and 11 above, a wet granulation was prepared by granulating this paste with a dye solution. The wet granulated composition was then passed through a hammer mill and dried overnight at 110° F. The dry granules were screened through a suitable size screen and the calcium stearate added. The mixture was then blended well and tablets compressed on a 9/32" flat, beveled punch, each tablet being of such size that it contained 20 mg. (base equivalent) of active ingredient.

*Example 14*

A dry solid pharmaceutical composition was prepared by blending the following materials in the proportions by weight specified:

| | |
|---|---|
| 3,4-dihydro-2(1H)-isoquinoline carboxamidine hydrochloride | 14.7 |
| Corn starch | 43.3 |
| Dicalcium phosphate | 40.0 |
| Calcium stearate | 2.0 |

The active ingredient was blended with part of the corn starch and all the dicalcium phosphate. A corn starch paste was then made by mixing in the balance of the starch and, as in Examples 10 and 11 above, a wet granulation was prepared by granulating this paste with a dye solution. The wet granulated composition was then passed through a hammer mill and dried overnight at 110° F. The dry granules were screened through a suitable size screen and the calcium stearate added. The mixture was then blended well and tablets compressed on a 9/32" flat, beveled punch, each tablet being of such size that it contained 20 mg. (base equivalent) of active ingredient.

*Example 15*

A dry solid pharmaceutical composition was prepared by blending the following materials in the proportions by weight specified:

| | |
|---|---|
| 3,4-dihydro-2(1H)-isoquinoline carboxamidine | 21 |
| Calcium silicate (Microcel C) | 150 |
| Pregelatinized corn starch | 29 |
| Dicalcium phosphate | 50 |
| Corn starch | 50 |
| Talc, U.S.P. | 3 |
| Calcium stearate | 3 |

The active ingredient was dissolved in 2B alcohol (15% w./v.) and absorbed on the calcium silicate. This was then mixed with the pregelatinized corn starch, dicalcium phosphate and corn starch. The mixture was granulated by the addition of distilled water. It was then dried at 37°, passed through a suitable size screen, blended with the talc and calcium stearate and mixed well. Tablets were compressed from the resulting mixture on a 15/32" size punch, each tablet being of such size that it contained 20 mg. of the active ingredient.

*Example 16*

A dry solid pharmaceutical composition was prepared by blending the following materials in the proportions by weight specified:

| | |
|---|---|
| 3,4-dihydro-2(1H)-isoquinoline carboxamidine | 21 |
| Magnesium carbonate | 150 |
| Pregelatinized corn starch | 29 |
| Dicalcium phosphate | 50 |
| Corn starch | 50 |
| Talc, U.S.P. | 3 |
| Calcium stearate | 3 |

The active ingredient was dissolved in 2B alcohol (15% w./v.) and absorbed on the magnesium carbonate. This was then mixed with the pregelatinized corn starch, dicalcium phosphate and corn starch. The mixture was granulated by the addition of distilled water. It was then dried at 37° C., passed through a suitable size screen, blended with the talc and calcium stearate, and mixed well. Tablets were compressed from the resulting mixture on a 15/32" size punch, each tablet being of such size that it contained 20 mg. of the active ingredient.

*Example 17*

2.1 g. of 1,2,3,4-tetrahydro-7-methoxy-6-isoquinolinol hydrochloride and 0.6 g. of cyanamide were refluxed for 3 hours in 50 mls. of dried xylene in an oil bath. After cooling, the xylene was decanted off. The residue was dissolved in about 30 ml. of alcohol and filtered from some undissolved material. The filtrate was cautiously diluted with ether until turbid. On standing, crystals separated slowly and were filtered off. Recrystallization from alcohol/ether gave 3,4-dihydro-6-hydroxy-7-methoxy - 2(1H) - isoquinolinecarboxamidine hydrochloride, melting point 248°.

The end-product, thus obtained, is useful as a hypotensive and vasodilator. More particularly, it effects an increase in peripheral vascular blood flow with a decrease in peripheral vascular resistance and without any substantial inhibition of the peripheral autonomic system, nor any significant blocking effect upon adrenergic effector sites. It is preferably administered parenterally, but can also be administered orally.

*Example 18*

4.2 g. of 1,2,3,4 - tetrahydro - 6 - methoxy - 7 - isoquinolinol hydrochloride and 1.2 g. of cyanamide were refluxed in 50 mls. of xylene with stirring in an oil bath for 2 hours. After cooling, the xylene was decanted from a viscous bottom layer. Upon recrystallization of the bottom layer from alcohol, 3,4 - dihydro - 7 - hydroxy - 6 - methoxy - 2(1H)isoquinolinecarboxamidine hydrochloride was obtained of melting point 228°.

The end-product thus obtained, is useful as a hypotensive and vasodilator. More particularly, it effects an increase in peripheral vascular blood flow with a decrease in peripheral vascular resistance and without any substantial inhibition of the peripheral autonomic system, nor any significant blocking effect upon adrenergic effector sites. It is preferably administered parenterally, but can also be administered orally.

I claim:

1. A compound selected from the group consisting of compounds of the formula

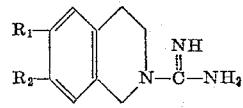

wherein $R_1$ and $R_2$ are individually selected from the group consisting of lower alkoxy and taken together, lower alkylenedioxy and acid-addition salts thereof with pharmaceutically acceptable acids.

2. 6,7 - dilower alkoxy - 3,4 - dihydro - 2(1H) - isoquinolinecarboxamidine.

3. 6,7 - dimethoxy - 3,4 - dihydro - 2(1H) - isoquinolinecarboxamidine.

4. A compound selected from the group consisting of compounds of the formula

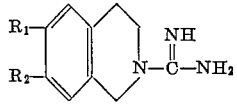

wherein $R_1$ and $R_2$ are selected from the group consisting of hydroxy and lower alkoxy, one of $R_1$ and $R_2$ being hydroxy and the other of $R_1$ and $R_2$ being lower alkoxy and acid-addition salts thereof with pharmaceutically acceptable acids.

5. 3,4 - dihydro - 6 - hydroxy - 7 - lower alkoxy - 2 - (1H) - isoquinolinecarboxmidine.

6. 3,4 - dihydro - 6 - hydroxy - 7 - methoxy - 2(1H) - isoquinolinecarboxmidine.

7. 3,4 - dihydro - 7 - hydroxy - 6 - lower alkoxy - 2(1H) - isoquinolinecarboxamidine.

8. 3,4 - dihydro - 7 - hydroxy - 6 - methoxy - 2 - (1H) - isoquinolinecarboxamidine.

9. A compound selected from the group consisting of the acid addition salts of 3,4 - dihydro - 2(1H) - isoquinoline carboxamidine with pharmeceutically acceptable acids.

References Cited by the Examiner
UNITED STATES PATENTS 2,951,843   9/1960   Haack _____ 260—288

ALEX MAZEL, *Primary Examiner.*

NICHOLAS S. RIZZO, *Examiner.*

D. G. DAUS, *Assistant Examiner.*